W. H. ROSE.
DISINFECTING APPARATUS.
APPLICATION FILED DEC. 31, 1908.
964,559.
Patented July 19, 1910.
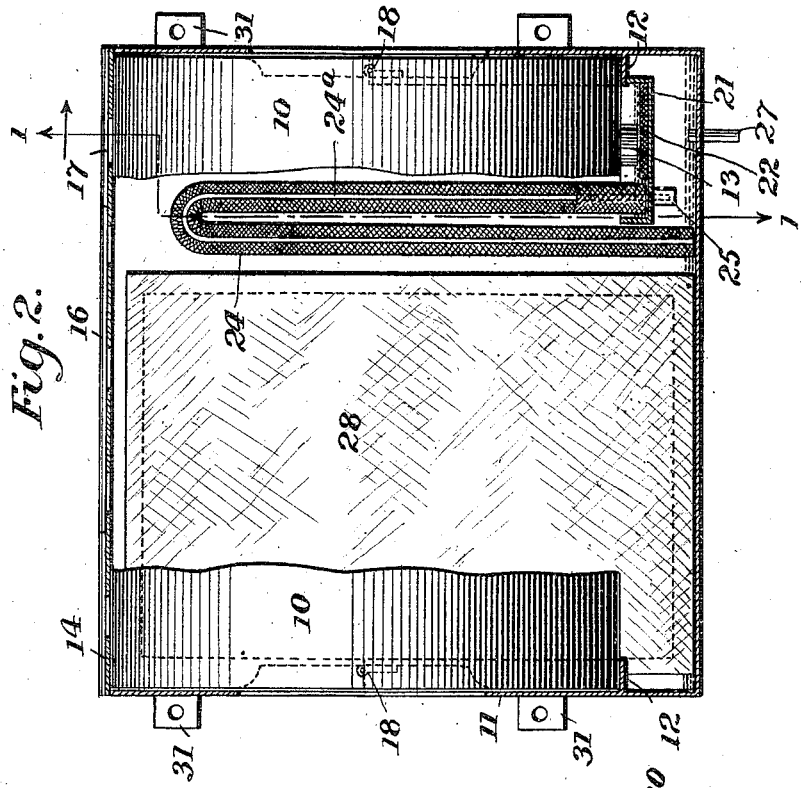
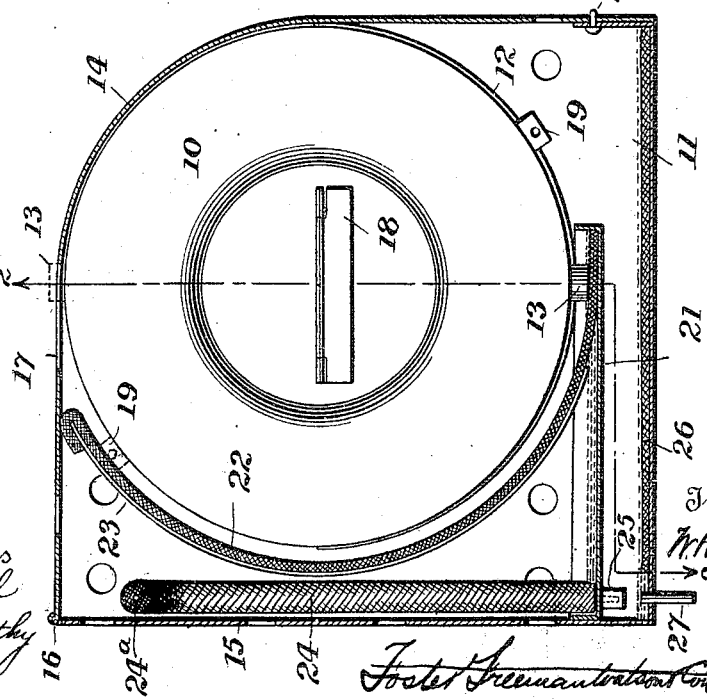

UNITED STATES PATENT OFFICE.

WILLIAM H. ROSE, OF NEW YORK, N. Y., ASSIGNOR TO INTERSTATE CHEMICAL COMPANY, OF JERSEY CITY, NEW JERSEY, A CORPORATION OF NEW JERSEY.

DISINFECTING APPARATUS.

964,559.   Specification of Letters Patent.   Patented July 19, 1910.

Application filed December 31, 1908. Serial No. 470,222.

*To all whom it may concern:*

Be it known that I, WILLIAM H. ROSE, a citizen of the United States, and residing at New York, in the county of New York and State of New York, have invented certain new and useful Improvements in Disinfecting Apparatus, of which the following is the specification.

This invention relates to an apparatus which may be used either as a disinfecting device or for deodorizing or for both purposes.

The invention will be described in connection with the accompanying drawing in which, Figure 1 is an end view partly in section on the line 1—1 of Fig. 2, and Fig. 2 is a front view partly in section on the line 2—2 of Fig. 1.

The apparatus comprises a cylindrical tank 10, which is rotatably mounted in a casing 11, the tank being supported in segmental strips 12 or otherwise suitably supported in the casing. The object of rotatably supporting the tank is to permit of filling it without removing it from the casing in which it is supported. In Figs. 1 and 2, the tank is shown in full lines in its discharging position, in which the filling opening 13 is on the lower side of the tank and in Fig. 1 the filling opening is shown at the top in dotted lines. The casing 11 is preferably provided with a cover 14 which is hinged to the back 15 at the corner 16. The cover is provided with a suitable opening 17 to permit the neck of the filling opening to pass when the tank is turned for filling. A suitable handle 18, shown in the form of a hinged flap, is connected with the end of the tank and a perforated ear 19 may be provided on the tank for locking it to prevent turning, if desired. The cover 17 may be fastened down by any suitable device. As shown, a pin 20 on the fixed casing passes through a perforation in the cover and serves to hold it closed. The tank 10 can be removed from the casing 11 by opening the cover 14 and lifting it off its supports.

When the filling neck or opening of the tank is turned down, it enters a trough 21, which is supported within and near the bottom of the casing. The liquid is discharged from the tank into the trough until it rises sufficiently to seal the filling opening, and thereafter the liquid can only be discharged when the fluid in the trough falls below the opening and permits air to enter the tank. The principle upon which this operates is well known and need not be described in detail.

To prevent the fluid in the tank from running out while the tank is being inverted after filling, I provide a guard which is adapted to practically close the opening during the movement of the tank. As shown, this guard is a strip of felt 22 which is connected to an arc-shaped metal strip or backing 23. The strip of felt is concentric with the tank 10 and adapted to prevent liquid from splashing out of the tank while the latter is being turned. The strip 22 is preferably extended into the trough 21 and assists in regulating the discharge of fluid from the tank and also prevents any sudden rush of fluid from the tank into the trough when the tank is first inverted, or when subjected to a sudden shock or jar.

To effect a slow discharge of the fluid from the trough 21, I use a siphon wick 24 and regulate the discharge by the height of the bend between the two limbs of the wick. For this purpose I preferably embed in the wick a malleable strip or wire $24^a$, which is stiff enough to support the wick and easily bent to give the wick the desired form. The wick may be supported, as shown in the drawing, by inserting one end of the wire in a socket 25 connected with the trough 21. It will be understood that the lower the bend in the wick, the greater will be the discharge, and also that the flow will be up through the shorter limb of the wick and down through the longer limb. The shorter limb extends into the trough 21 and the longer limb preferably extends to the bottom of the casing 11. I preferably provide a layer of absorbent material 26 on the bottom of the casing to receive the discharge from the wick and increase the evaporating surface.

When the device is to be used for dropping disinfecting fluid, I provide a short discharge tube 27 extending through the bottom of the casing and, preferably, slightly above the same. The fluid will drop at intervals, depending upon the rapidity of the discharge of the siphon wick.

When the apparatus is to be used for deodorizing purposes, I provide a large flat wick or mass of absorbent material 28, which is suitably supported in the casing with its lower edge in the trough 26. This absorbent material 28 may be exposed to the atmosphere by any suitable openings in the casing. As shown, openings in the walls and top of the casing, permit air to circulate through the casing in contact with the absorbent material 28. The casing may be attached to the wall or other support by any suitable means, such as the lugs 31.

It will be evident that various changes in the construction and arrangement of the apparatus herein described, may be made without departing from the spirit of the invention, hence I do not desire to limit myself to the precise apparatus illustrated.

What I claim and desire to secure by Letters Patent is:

1. In an apparatus of the class described, the combination of a casing, a tank supported to turn in bearings in the casing and provided with an opening, the said tank being constructed to be rotated in its bearings to position the opening in filling and discharge positions, and means for dispensing the disinfectant.

2. In an apparatus of the class described, the combination with a fixed casing, of a tank rotatably mounted therein and provided with a common filling and discharge opening, said tank being constructed to be rotated about its axis to position the opening in filling and discharge positions, a trough into which said tank discharges when turned to bring said opening to its lower side, and means for dispensing the disinfectant from said trough.

3. In an apparatus of the class described, the combination with a casing, of a tank rotatably mounted therein and provided with a common filling and discharge opening, said tank being constructed to be rotated about its axis to position the opening in filling and discharge positions, a trough below said tank to receive the discharge therefrom, means for dispensing the fluid from said trough, and a guard constructed to prevent the fluid from spilling while the tank is being turned to move the opening from the filling position to the discharge position.

4. In an apparatus of the class described, the combination with a casing, of a rotatable tank therein having a common filling and discharge opening, said tank being constructed to be rotated about its axis to position the opening in filling and discharge positions, a trough into which said tank discharges, a siphon wick for conducting and regulating the discharge from said trough, a lower trough for receiving the discharge from the siphon wick, and means for dispensing the fluid from said lower trough.

5. In an apparatus of the class described, the combination with a casing having arc-shaped supports therein, of a cylindrical tank mounted to turn in said supports and provided with a common filling and discharge opening, a guard concentric with said tank and adapted to prevent splashing of the fluid from said opening when the tank is turned, a trough into which said fluid discharges when the tank is inverted, and a wick for conveying the fluid from said trough.

6. In an apparatus of the class described, a siphon wick comprising an absorbent material, a U-shaped malleable wire for supporting said material, and a socket to receive one end of the wire, the said wire being adapted to be bent to vary the height of the bent portion and thereby regulate the height of the uppermost portion of the wick above the source of fluid supply, for the purpose set forth.

In testimony whereof I affix my signature in presence of two witnesses.

WILLIAM H. ROSE.

Witnesses:
  LOUIS E. PARENT,
  JOHN M. WARREN,